Jan. 15, 1952  F. G. MITCHELL  2,582,881
CARRIER-TYPE ENDLESS CONVEYER
Filed July 6, 1950  5 Sheets-Sheet 1
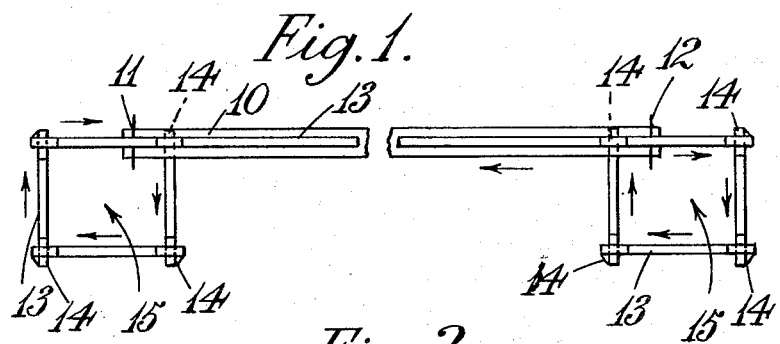
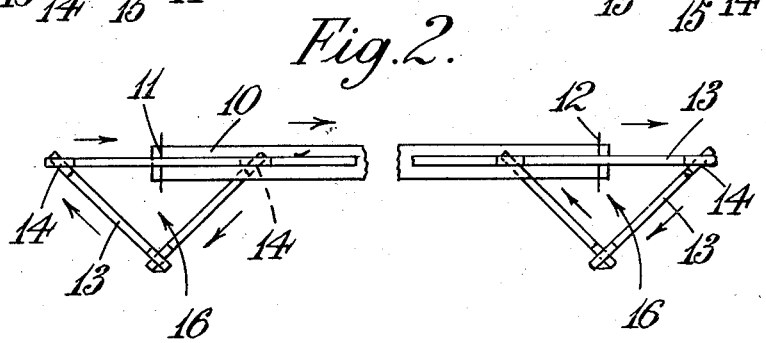
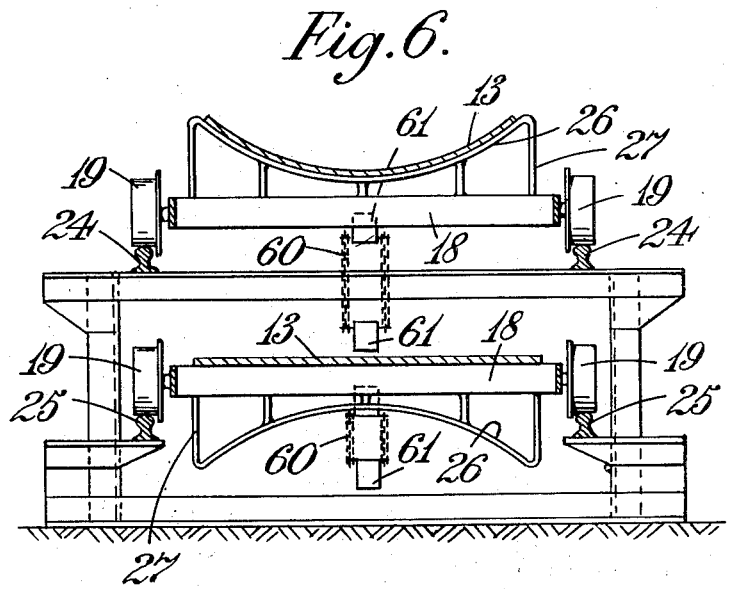
INVENTOR
F. G. Mitchell
By Watson, Cole, Grindle & Watson

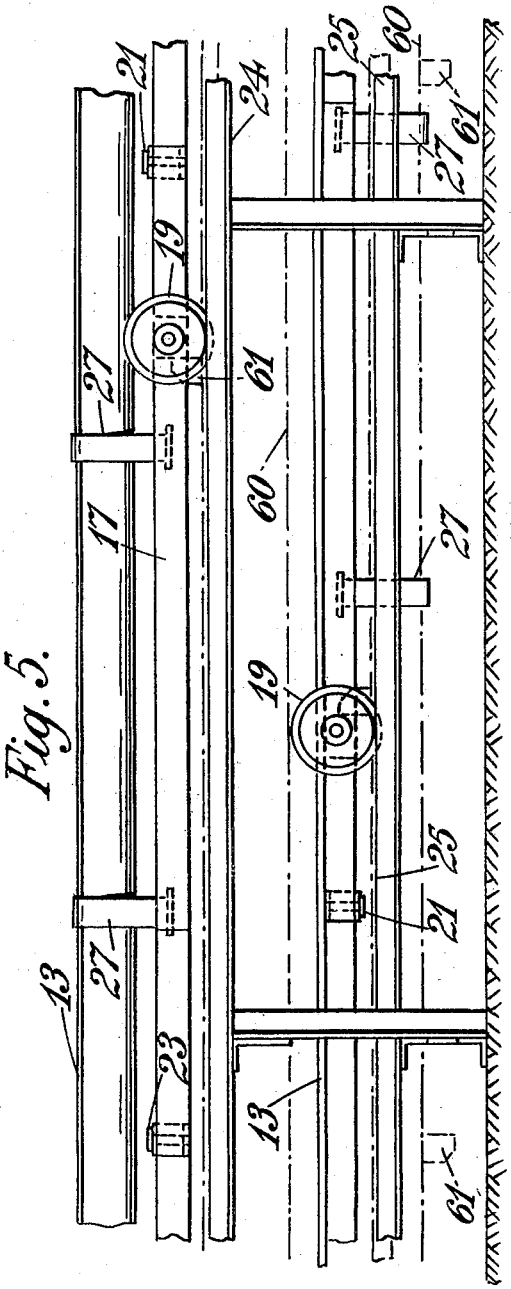
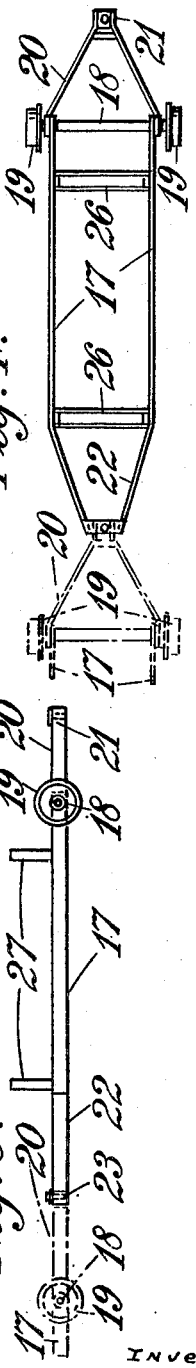

Jan. 15, 1952     F. G. MITCHELL     2,582,881
CARRIER-TYPE ENDLESS CONVEYER
Filed July 6, 1950     5 Sheets-Sheet 3
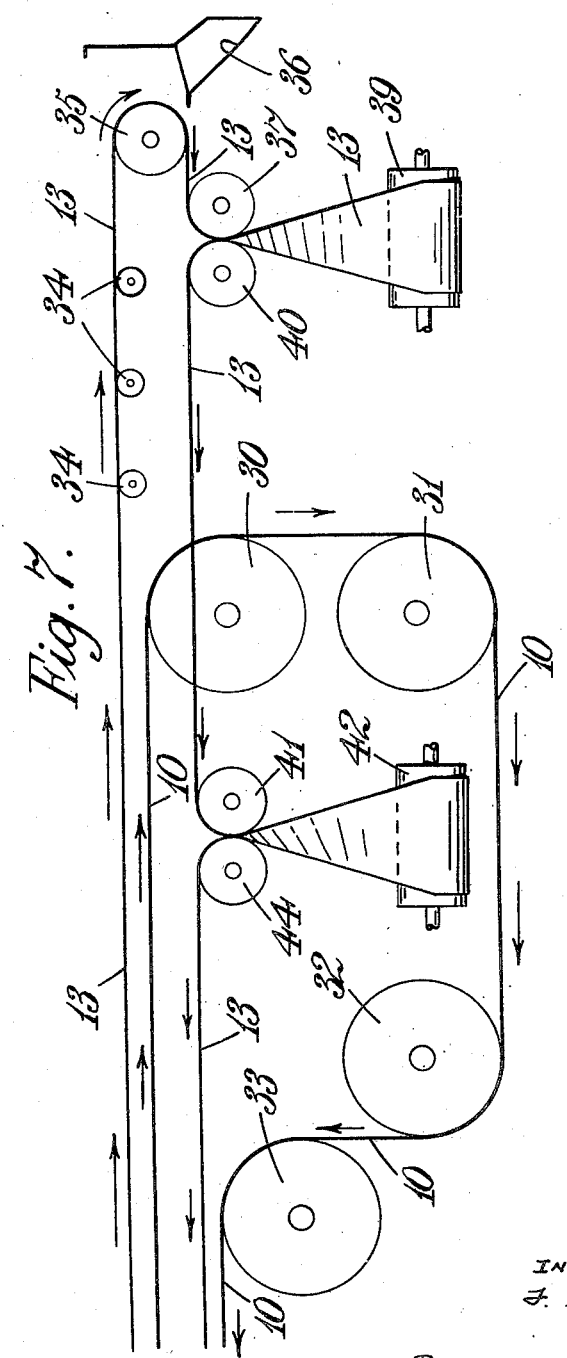
INVENTOR
F. G. Mitchell
By Watson, Cole, Grindle
    & Watson Jan. 15, 1952   F. G. MITCHELL   2,582,881
CARRIER-TYPE ENDLESS CONVEYER
Filed July 6, 1950   5 Sheets-Sheet 4
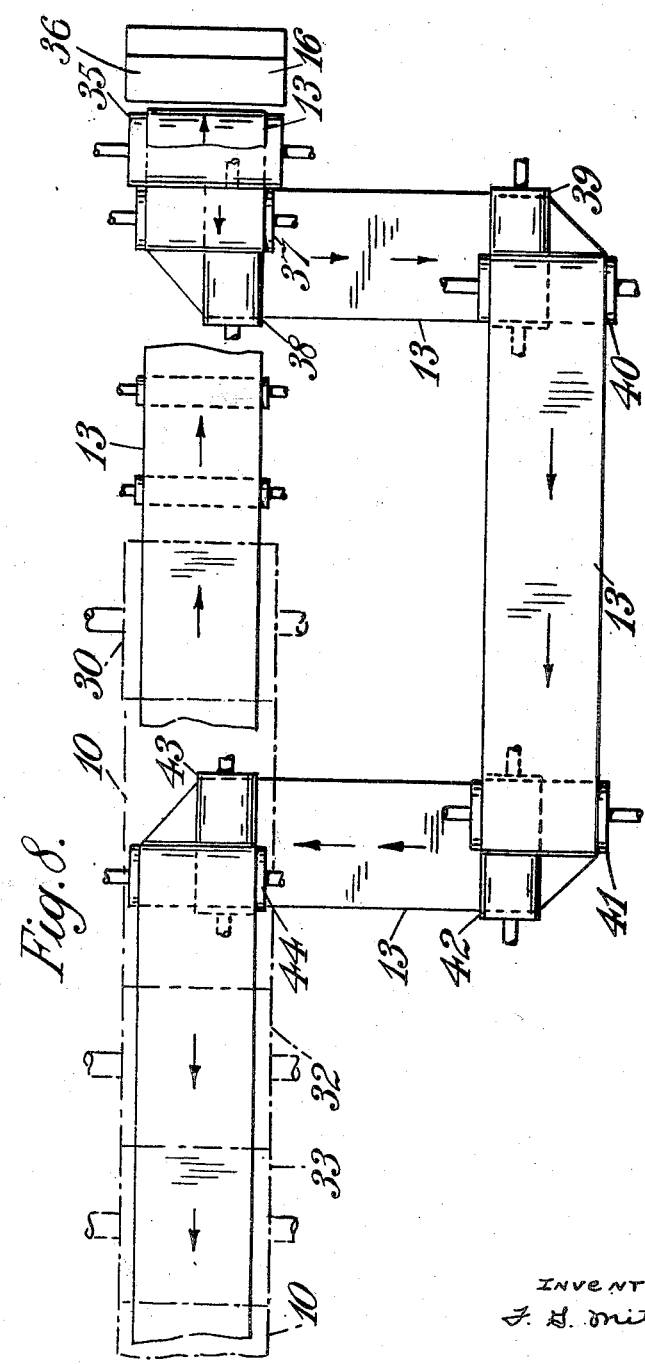
INVENTOR
F. G. Mitchell
By Watson, Cole, Grindle
& Watson Jan. 15, 1952  F. G. MITCHELL  2,582,881
CARRIER-TYPE ENDLESS CONVEYER
Filed July 6, 1950  5 Sheets-Sheet 5
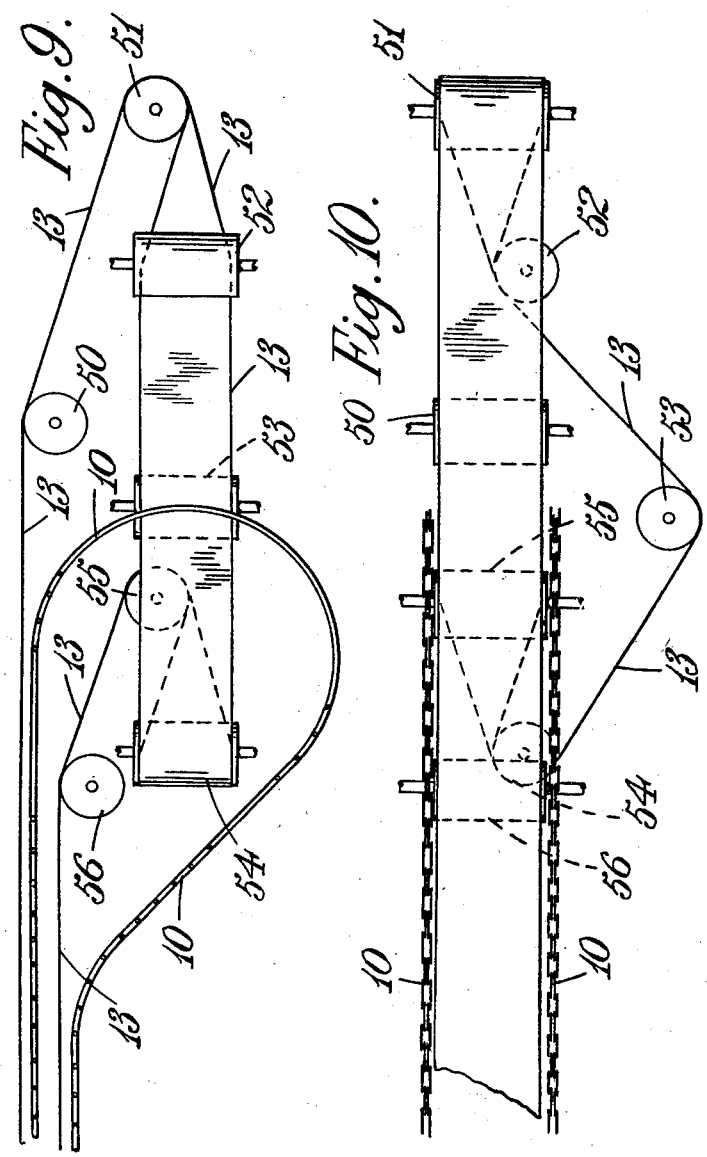
INVENTOR
F. G. Mitchell
By Watson, Cole, Grindle
& Watson Patented Jan. 15, 1952

2,582,881

UNITED STATES PATENT OFFICE 2,582,881

CARRIER-TYPE ENDLESS CONVEYER

Frederick Gilbert Mitchell, London, England

Application July 6, 1950, Serial No. 172,288
In Great Britain July 8, 1949

6 Claims. (Cl. 198—184)

This invention relates to endless conveyors for dealing continuously with materials in bulk.

The invention is concerned with endless conveyors of the type (hereinafter referred to as "the carrier type") comprising an endless chain of wheeled carriages articulated to one another and arranged to run on rails or an equivalent track having upper and lower runs, and an endless flexible belt or the like adapted to provide the actual carrier surface for the material being conveyed, and (for the greater part of its length) to be supported by and to travel with the carriage chain.

In a known arrangement (see British Specification No. 588,450) of carrier-type conveyor the articulated carriages are guided by an endless track having upper and lower runs situated more or less vertically one above the other and connected at each end of the conveyor by a loop which extends downwardly as viewed in elevation and laterally as viewed in plan; the object of the loop being to reverse the direction of travel of the carriages without changing their upright aspect. In the known arrangement referred to, the flexible belt extends beyond the runs of the carriage chain at the delivery and tail ends of the conveyor, and the extended belt portions are supported by idlers and led over end pulleys from which, at the delivery end, the material may be discharged and in front of which, at the tail end, the material may be fed. With this arrangement the belt leaves the carriages when the latter are deflected by either end loop and the belt is turned without lateral deflection on to the other run of the carriage chain.

According to the present invention a conveyor of the carrier type is so arranged that, at the ends of the conveyor, the carriage chain is guided to be turned from forward to return run and vice versa without lateral deflection, and the flexible belt is deflected laterally and is then guided so as to enter and leave the gap between the upper and lower runs of the carriage chain, whereby each run of the belt is supported on the carriage chain.

If desired, and according to a feature of the invention, the carriage chain, at each end of the conveyor, may be taken over pulleys mounted for rotation about horizontal axes or over equivalent guides to provide between the upper and lower runs of the chain an increased gap to facilitate the passage of the return lap of the flexible belt into and out of a position between the upper and lower runs of the chain.

In one arrangement according to the invention, the flexible belt is arranged to be carried beyond the carriage chain at each end of the conveyor and to be passed over a suitable combination of guide pulleys designed to reverse the direction of travel of the belt and to guide it either (at the delivery end of the conveyor) into the gap between the upper and lower runs of the carriage chain and thus into a position in which the belt is supported by the lower carriages, or (at the tail end) out of the gap aforesaid and into a position surmounting the carriages of the upper run. The end guide pulleys may, for example, be arranged to direct the belt in a laterally extending rectangular loop, turning the belt in succession through four right angles. Alternatively, a triangular loop involving a smaller number of guide pulleys may be employed.

Some examples embodying the foregoing and other features of the invention will now be described with reference to the accompanying drawings which are to some extent diagrammatic and in which:

Figures 1 and 2 are diagrams showing in plan two alternative end turning arrangements for the conveyor belt;

Figures 3 and 4 show in side elevation and plan respectively one of the belt-supporting carriages of the conveyor chain;

Figure 5 is a side elevation of a portion of the conveyor, intermediate in its length, showing the arrangement of the upper and lower runs;

Figure 6 is a cross section of the conveyor, at the intermediate portion shown in Figure 5;

Figures 7 and 8 show in side elevation and plan respectively the terminal arrangements which may be employed at the delivery end of the conveyor; and Figures 9 and 10 show in side elevation and plan respectively, terminal arrangements which may be used in place of those illustrated in Figures 7 and 8.

Like reference numerals indicate like parts throughout the drawings.

Referring to Figure 1, the conveyor comprises an endless chain 10 of wheeled carriages arranged to run on upper and lower tracks between a tail end 11 and a delivery end 12. At each end of the conveyor the carriage chain 10 is turned from forward to return run and vice versa without lateral deflection. The chain supports a flexible belt 13 which at each end of the conveyor is extended beyond the corresponding end of the carriage chain and is passed over a combination of guide pulleys 14 designed to reverse the direction of travel of the belt and guide it either (at the delivery end 12 of the conveyor) into the gap between the upper and lower runs of the carriage chain, or (at the tail end 11 of the conveyor) out of the gap aforesaid and on to the upper carriage run. In the arrangement diagrammatically illustrated in Figure 1 the end guide pulleys 14 are arranged to direct the belt in a laterally extending rectangular loop 15, turning the path of the belt in succession through four right angles.

In the arrangement shown in Figure 2, the end guide pulleys 14 are arranged, as illustrated, to form a triangular loop 16.

Referring to Figures 3 to 6, the conveyor there illustrated comprises an endless chain 10 of wheeled carriages, each constituted by an elongated frame 17 carrying at one end an axle 18 on which running wheels 19 are mounted. A forked link 20 is pivotally attached to the axle 18 for swinging movement about the axle and provides at its end remote from the axle a coupling piece 21 for the attachment by a vertical pivot, of the next adjacent carriage of the chain. The end of the frame remote from the axle 18 has a rigid extension 22, the extremity of which is equipped with a coupling piece 23 similar to the coupling 21 on the link 20. The coupling piece 23 provides means for interconnecting, by a vertical pivot, the hinge link 20 of the next adjacent carriage (shown in chain lines in Figures 3 and 4). The foregoing arrangement is such that, as will be seen, the carriage chain may flex in a vertical direction about any wheel axle 18 and in a horizontal direction about the vertical pivot bearings of the coupling pieces 21, 23.

The wheels 19 are adapted to run on upper and lower rail tracks 24, 25 (Figures 5 and 6), disposed vertically one above the other. Each carriage is furnished with dished cross plates 26 carried by bearers 27 extending upwardly from the carriage, and the plates 26 support the upper lap of the conveyor belt 13. At each end of the general run of the conveyor, the aspect of each carriage is reversed, the carriages on the return run being "upside down" in relation to those in the forward run. In the arrangement shown in Figures 5 and 6 the lower, i. e. return lap of the belt is supported directly by the carriage axles and the undersides of the carriage frames. If desired, however, each carriage, in addition to its upwardly extending belt plates 26 may be furnished with opposed secondary plates (not shown) carried on oppositely directed bearers, the secondary plates being uppermost on the return run of the chain and so being adapted to support the return lap of the belt.

In the end turning method shown in Figures 7 and 8, the following arrangement is adopted:

The forward lap of the carriage chain 10 is taken over idler wheels 30, 31, 32, 33 which, as shown, increase the vertical gap between the forward and return runs of the chain at the delivery end of the conveyor. The upper run of the endless belt 13 is taken over guide pulleys 34 located beyond the corresponding end of the carriage chain and thence over a terminal pulley 35 where the material being conveyed is delivered, e. g. through a chute 36. From the terminal pulley 35 the belt is guided over an idler 37 and downwardly, with 90° twist to the first member 38 of a series of guide pulleys or idlers constituting a rectangular belt-turning loop. From the idler 38 the belt is taken laterally in a horizontal plane to a pulley 39, thence upwardly with 90° twist to a pulley 40 from which it proceeds in a horizontal run to the next corner of the loop. There the belt passes over a pulley 41 and downwardly with 90° twist on to and under a pulley 42 and from thence in a horizontal run to a pulley 43 located in the gap between the guide pulleys 30—33 of the carriage chain. The belt is then taken upwardly with 90° twist over a pulley 44 and from thence it forms the return run of the belt which, as will be seen, is thus guided into a position between the forward and return runs of the carriage chain. The vertical spacing between successive belt pulleys disposed at right angles is arranged to be appropriate to the width of the belt which has to be twisted through 90° in passing from one pulley to the next. The lateral distance through which the path of the belt is deflected is arranged to suit the site and nature of the structure. Figures 7 and 8 illustrate the turning arrangements at the delivery end of the conveyor; similar arrangements are at the tail end of the conveyor.

In the end-turning method shown in Figures 9 and 10 the following arrangement is employed:

The forward lap of the carriage chain 10, at the delivery end of the conveyor, is guided (by any convenient means, not shown) to be turned through a downwardly extending loop—but without lateral deflection—into the return lap. The upper run of the endless belt 13 is taken beyond the looped turn of the carriage chain, over parallel guide pulleys 50, 51 and from thence with a 90° twist over a pulley 52 from which the belt is laterally deflected over a pulley 53 and up to a pulley 54 within the loop of the carriage chain. From the latter pulley the belt is directed with a 90° twist to a pulley 55 under and round which is passes, proceeding upwardly over a pulley 56 into the general return run of the belt, i. e. between the upper and lower runs of the carriage chain. While the drawings again illustrate the delivery end of the conveyor, it is to be understood that similar turning arrangements will be employed at the tail end.

Any convenient driving means may be employed for propelling the carriage chain.

For example, devices of the known creeper-chain type may be employed. Such devices are indicated in chain lines in Figure 5 as comprising chains 60 carrying dogs 61 arranged to engage against the carriage wheel axles. As indicated there is one creeper device below the forward run of the conveyor and a second one below the return run of the conveyor, the first device supplying the driving power to the loaded stretch of the conveyor and the second device taking the retarding load of the return run. The creeper devices may conveniently be located near the delivery end of the conveyor. Alternatively the conveyor may be divided in its length into a plurality of sections, creeper devices or equivalent driving means being provided at corresponding ends of the several sections so as to apply to each section a proportional part of the required total propelling force, i. e. a part proportional to the load on that portion only of the carrier which extends from the point of application to the end of the next succeeding section.

In carrying out this invention it is essential that the endless belt constituting the actual supporting surface of the conveyor should be separate from the carriage chain, since the end turning arrangements necessitate relative displacement between the belt and the chain at the ends of the conveyor. Quite apart from this consideration, the fact that the belt and chain are unconnected components of the conveyor is of considerable advantage in providing for variations in linear expansion of the two components. In a long run, variations in linear expansion and stretch of the belt and carriage chain may be considerable and but for the fact that the two are separate there would be difficulty in accommodating these differences.

I claim:

1. An endless conveyor of the carrier type comprising in combination an endless chain of wheeled carriages articulated to one another and arranged to travel on a track having upper and lower runs, an endless flexible belt adapted to provide the actual carrier surface for the material being conveyed and, for the greater part of its length, to be supported by and to travel with the carriage chain, guides at each end of the conveyor for turning the carriage chain from forward to return run and vice versa without lateral deflection, and means at each end of the conveyor for guiding the flexible belt by lateral deflection into and out of the gap between the upper and lower runs of the carriage chain.

2. An endless conveyor of the carrier type comprising in combination an endless chain of wheeled carriages articulated to one another and arranged to travel on a track having upper and lower runs, an endless flexible belt adapted to provide the actual carrier surface for the material being conveyed and, for the greater part of its length, to be supported by and to travel with the carriage chain, guides at each end of the conveyor for turning the carriage chain from forward to return run and vice versa without lateral deflection and guide pulley combinations at each end of the conveyor for directing the belt beyond the corresponding ends of the chain and in laterally extending loops into and out of the gap between the upper and lower runs of the carriage chain.

3. An endless conveyor as claimed in claim 2 in which each of the aforesaid guide pulley combinations is arranged to direct the belt in a laterally extending rectangular loop, turning the direction of travel of the belt in succession through four right angles.

4. An endless conveyor as claimed in claim 2 in which each guide pulley combination is arranged to direct the belt in a laterally extending triangular loop.

5. An endless conveyor as claimed in claim 2 in which each guide pulley combination is arranged to cause the belt to follow a path which, in relation to the general run of the conveyor, is deflected in both lateral and vertical directions.

6. An endless conveyor as claimed in claim 1 in which the carriage chain, at the ends of the conveyor, is taken over guide members arranged to provide between the upper and lower runs of the chain an increased gap to facilitate the passage of the return lap of the flexible belt into and out of a position between the upper and lower runs of the chain.

FREDERICK GILBERT MITCHELL.

No references cited.